United States Patent [19]

Russell

[11] 3,789,982

[45] Feb. 5, 1974

[54] RANDOM ACCESS CARD FILING AND RETRIEVAL APPARATUS

[75] Inventor: Walter Russell, Michigan City, Ind.

[73] Assignees: Carol Ann Tolash; Victoria L. Tolash; Julianna Tolash, all of Michigan City, Ind. ; part interest to each

[22] Filed: Feb. 16, 1973

[21] Appl. No.: 333,403

[52] U.S. Cl. .................... 209/80.5, 209/122
[51] Int. Cl. .................... B07c 5/00
[58] Field of Search .................... 209/80.5, 110.5, 122

[56] References Cited

UNITED STATES PATENTS

| | | | |
|---|---|---|---|
| 1,235,502 | 7/1917 | Robinson | 209/110.5 |
| 1,702,994 | 2/1929 | Buckeridge | 209/110.5 |

*Primary Examiner*—Richard A. Schacher
*Assistant Examiner*—Gene A. Church
*Attorney, Agent, or Firm*—James P. Hume et al.

[57] ABSTRACT

An apparatus for the selection and retrieval of randomly filed cards is provided by this invention and includes an outer housing, used to contain a plurality of coded-cards, a series of movable and individually operable selector knives which are used in conjunction with the coded or notched sections of each card to select and isolate specific cards from the large number of cards contained in the housing, and a card elevator mechanism which is used to lift and isolate the selected cards from nonselected cards. Other more detailed features of the invention are described in the specification.

12 Claims, 14 Drawing Figures

RANDOM ACCESS CARD FILING AND RETRIEVAL APPARATUS

BACKGROUND OF THE INVENTION

This invention relates generally to a data filing and retrieval apparatus and more specifically to a low cost, compact, mechanical random access card filing and retrieval apparatus in which individual or select groups of coded, randomly filed cards can be selectively retrieved.

Currently available card filing and retrieval systems and apparatus in large measure employ complex and expensive electro-mechanical equipment to effect the selection of randomly filed data bearing cards and the like. It is not unusual, for example, for such electro-mechanical devices to have as many as fifty to one-hundred working parts and to be large and cumbersome, and thus, totally unsuitable for use in small offices or on desk tops. Moreover, such complex systems often require the use of expensive, specially-coded cards or, in some cases, separate card-coding equipment, which must be purchased for use with the card retrieval apparatus. Besides requiring maintenance at periodic intervals, such devices are not readily suitable for home or small office use.

A significant need has developed, therefore, for an inexpensive, portable card filing and retrieval apparatus, which is compact, and thus, does not utilize an excessive amount of needed space, and which, at the same time, can accurately, efficiently, and rapidly select randomly-filed data cards with purely mechanical equipment. Likewise, the increased demand for such retrieval devices for home, as well as office use, has created a particular need for equipment that is compact, inexpensive, easily maintained, and capable of employing easily coded, inexpensive cards.

SUMMARY OF THE INVENTION

In accordance with this invention, the above-recited difficulties are overcome by providing a random access card filing and retrieval apparatus which includes an outer housing used to contain a plurality of individually coded cards. The cards, for example, are coded by providing individual notched sections along at least one peripheral edge of the cards. A plurality of transversely movable selector knives are provided within a panel section of the housing and are slidably disposed therein to act in conjunction with the individual notched sctions of said cards. The individual selector knives are disposed in relation to the cards so that upon depression of an integrally connected selector key, attached to each selector knife, the knives are moved laterally and, thus, either engage the straight peripheral edge of a card (nonselected card) or move directly into a precut notch in the card (selected card). An elevator bar assembly is provided in the housing to isolate selected cards from nonselected cards and a retractable card holder bar is provided to restrict the movement of unselected cards while permitting relatively free movement of selected cards. In addition, a magnet assembly contained within the housing can be used in conjunction with magnetic elements imposed on each of the cards to effect the isolation and selection of the coded cards in cooperation with the displaced selector knives and corresponding notch positions on the cards.

Thus, with a minimum number of components, the apparatus of this invention can easily accomplish the selection of randomly filed cards. Moreover, the apparatus, because of its limited number of working parts, can be provided in portable, compact form suitable for use in homes or small offices. It requires no complex electro-mechanical elements and, yet, can accurately, efficiently and rapidly select randomly-filed data cards.

BRIEF DESCRIPTION OF THE DRAWINGS

Some of the various embodiments of this invention will be more readily understood through reference to the accompanying drawings in which.

DESCRIPTION OF THE EMBODIMENTS

Figures 1, 5, 6, 7, 8, 9, 10:
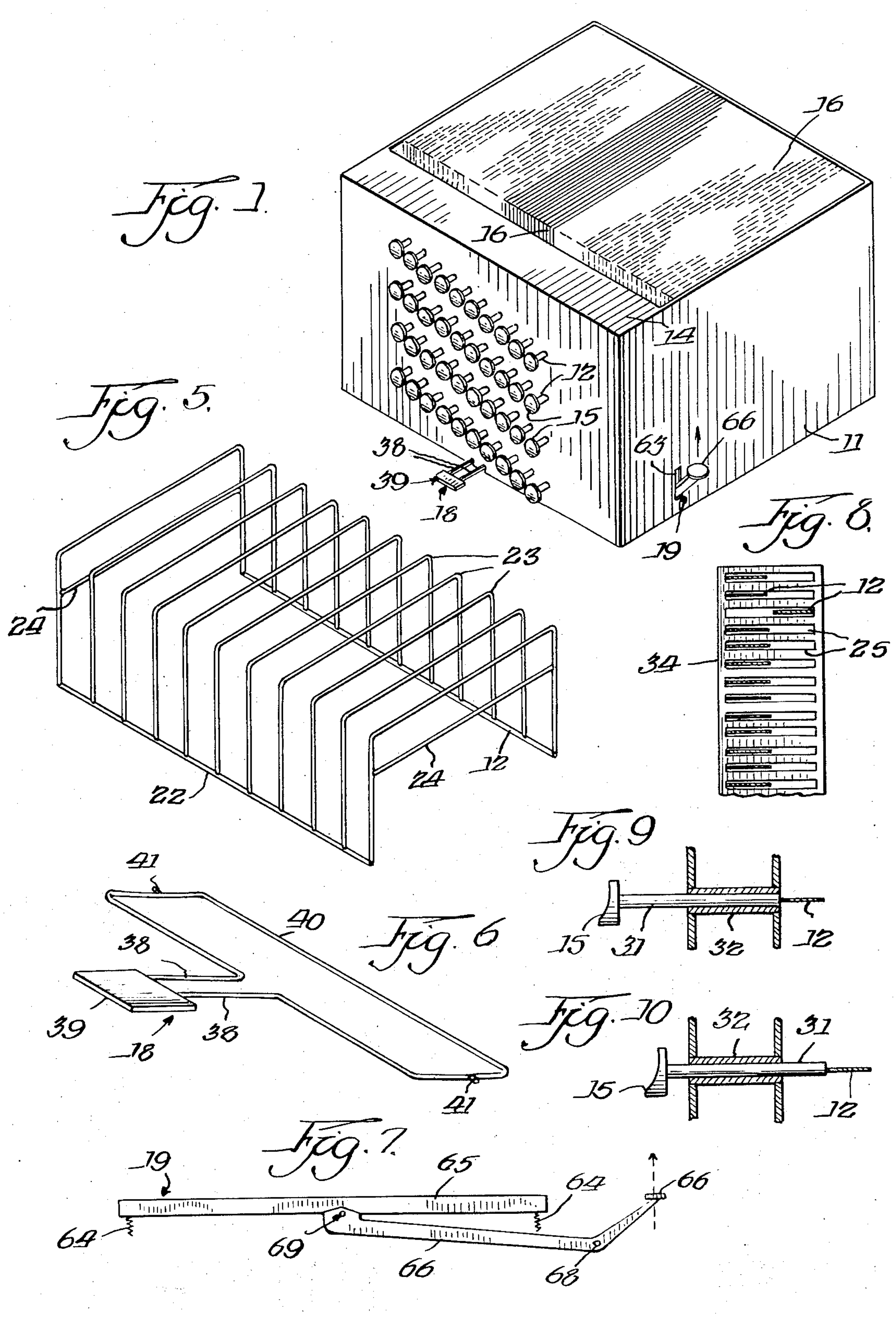
FIG. 1 is a perspective view of one embodiment of the card filing and retrieval apparatus of this invention.
FIG. 5 is a perspective view of the inner basket or frame used to hold a plurality of cards.
FIG. 6 is a perspective view of a card elevator assembly used to isolate selected cards after they have been selected.
FIG. 7 is a longitudinal view of a retractable card holder bar used to block the movement of unselected cards and to permit free movement of selected cards.
FIG. 8 is a transverse view of a guide assembly for holding and retaining the selector knives.
FIG. 9 is a transverse sectional view of an individual selector key in an undepressed, dormant or return position.
FIG. 10 is another sectional view of the same selector key illustrated in FIG. 9, this time in a depressed position.
Figure 2:
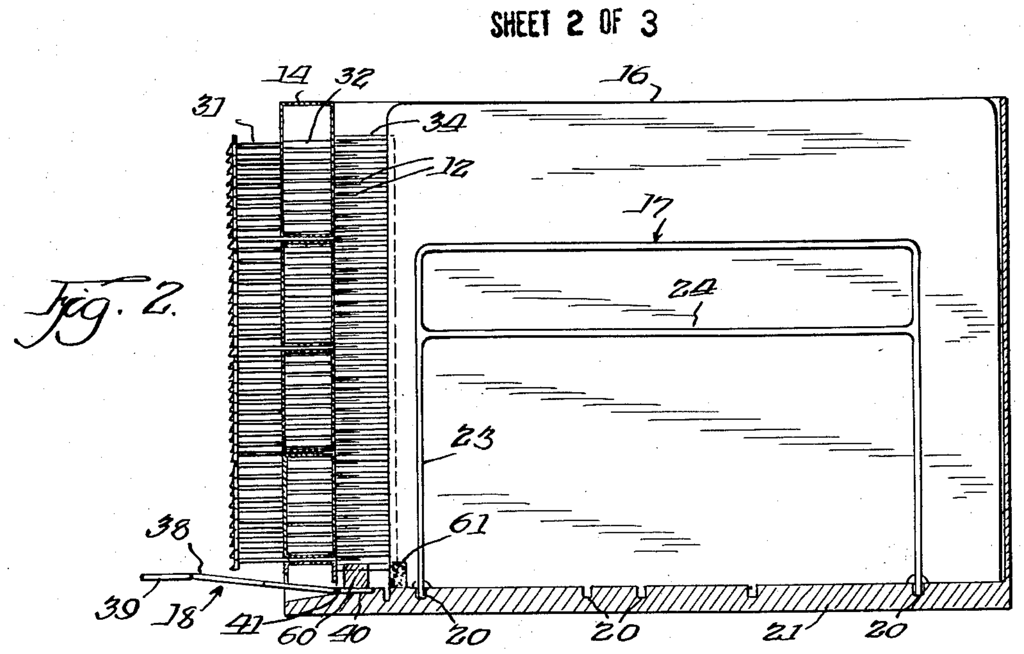
FIG. 2 is a transverse sectional view of the apparatus shown in FIG. 1 and specifically illustrating the outer housing and inner card-carrying frame structure for the apparatus, together with the plurality of slidable selector knives used to engage the coded cards.
Figures 3, 4:
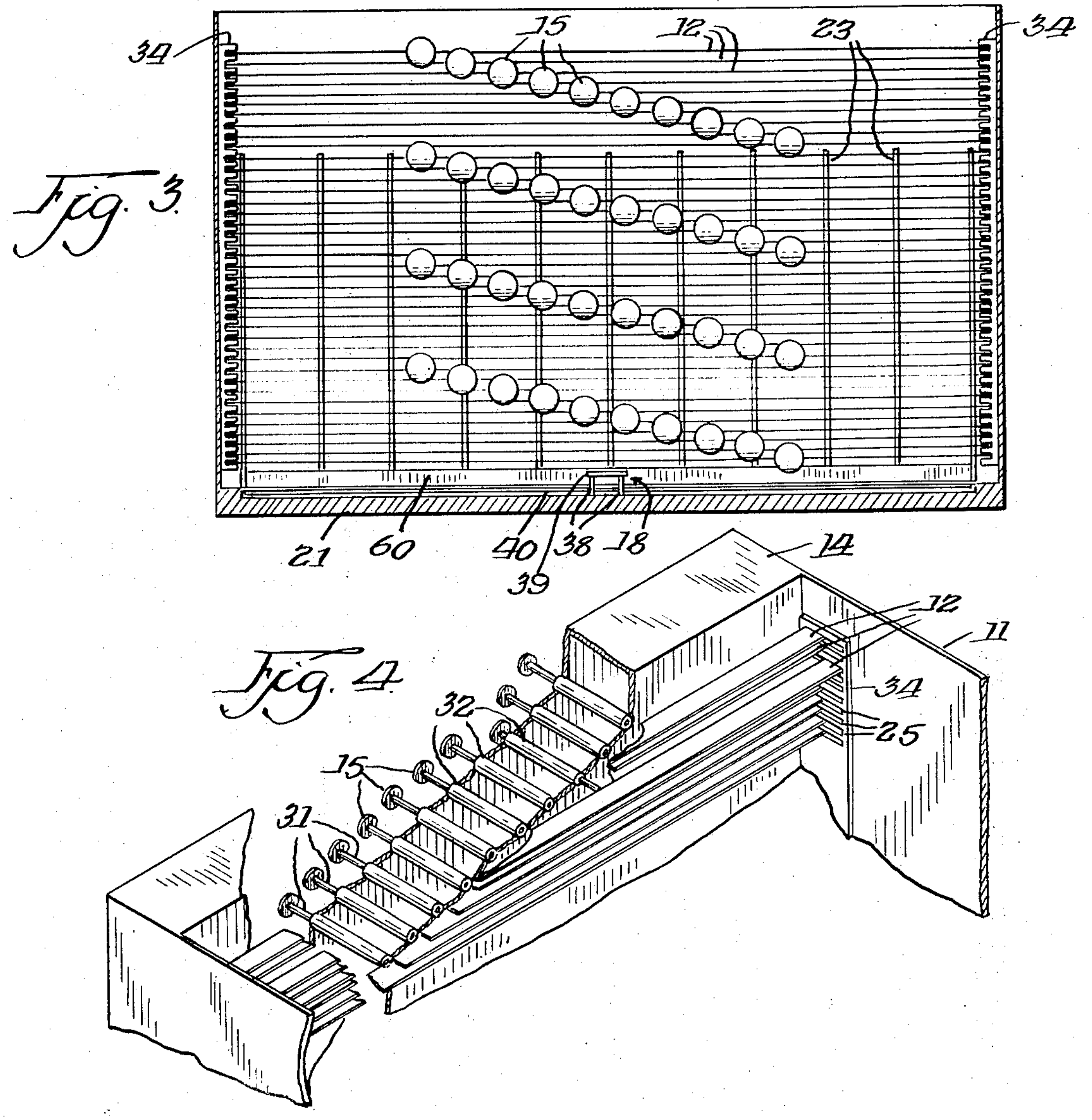
FIG. 3 is a longitudinal sectional view of the apparatus illustrated in FIG. 1 showing specifically a plurality of selector knives and associated selector keys used to effect the card retrieval function of the illustrated apparatus.
FIG. 4 is an exploded perspective view of the selector key assembly used to engage and move specific selector knives.

The basic features of one embodiment of the random access card filing and retrieval apparatus of this invention are generally illustrated in FIGS. 1–3. As shown therein, the apparatus generally comprises: an outer frame or housing 11; a plurality of selector knives 12 disposed adjacent panel section 14 of the housing; selector key assemblies 15, which are individually connected to selector knives 12, and which upon depression, impart a transverse motion to individual selector knives; a plurality of coded-cards 16 which are held in place by card basket 17 secured within housing 11; a card elevator bar 18, which is used to lift or isolate individual or groups of cards after their selection from the remaining cards present in the apparatus; and a retractable card holder bar 19, shown more specifically in FIG. 7, which is used to restrict the movement of unselected cards and to permit the free movement of selected cards.

As shown more specifically in FIGS. 2, 3 and 5, the coded cards contained within housing 11 are held in position by means of card basket 17. This card basket is held in place within housing 11 by side rail insertion racks 20 formed in the base portion 21 of housing 11. As shown more specifically in FIG. 5, for example, card basket 17 is generally a U-shaped structure having two spaced, parallel side rails 22, which fit tightly within the side rail insertion racks 20 formed in the base portion 21 of housing 11, and a plurality of U-shaped guide rails 23 spaced along the length of each side rail 22. Either before or after card basket 17 is secured within housing 11, cards 16 are placed within and carried by card basket 17 and supported by means of U-shaped guide rails 23. Slots 68 are provided on the cards 16 to engage and mate with side rails 22 so that the cards can be firmly held in place when card basket 17 is removed from the housing 11. It should be noted, of course, that card basket 17 can be inserted into insertion racks 20 or readily removed therefrom, and, in addition, is designed to accommodate lateral movement of the cards.

In order to assure that the cards 16 can be conveniently held in place within card basket 17 when it is removed from housing 11, card basket stiffeners 24 are provided on opposite sides of the two outermost U-shaped guide rails 23 to rigidize card basket 17 and assist it in maintaining a constant rectangular configuration. Thus, the rigidized card basket 17 is used to maintain the cards 16 in an orderly configuration within or outside of housing 11, and when placed within housing 11, has the further capability of allowing unrestricted lateral movement or displacement of the cards.

As shown more specifically in FIGS. 4 and 8–10, a plurality of laterally movable selector knives 12 are provided adjacent panel section 14 of housing 11. The selector knives, as shown, are contained adjacent panel section 14 and disposed along one side of the housing 11 directly adjacent cards 16. However, it should be understood that the selector knives can be located, in other embodiments of this invention, either at outermost upper or lower vertical sections of the housing or, for that matter, along any of the four edge sections of housing 11.

As shown in FIGS. 4 and 8–10, selector knives 12 are supported by means of motion guides 34, which are disposed at the opposite lateral ends of housing 11 directly adjacent panel section 14. Each motion guide has a series of spaced vertical openings 25 which individually support and permit the sliding movement of selector knives 12. Each selector key assembly 15, in turn, is individually connected to each selector knife 12 through connecting rod 31. Tube rod guides 32 mounted within panel section 14 provide a shaft assembly for accommodating sliding movement of connecting rod 31. Thus, for example, as shown in FIGS. 9–10, when key assembly 15 for any given selector knife 12 is depressed, the selector knife is moved laterally across opening 25 of motion guides 34. Likewise, when it is desired to return any individual selector knife 12 to its return or dormancy position, key assembly 15 is pulled back into its return position, as shown in FIG. 9. By means of this simple depression and return of individual key assemblies 15, individual selector knives 12 can be readily moved into and out of an engaging relationship with cards 16.

Figures 11, 12, 13:
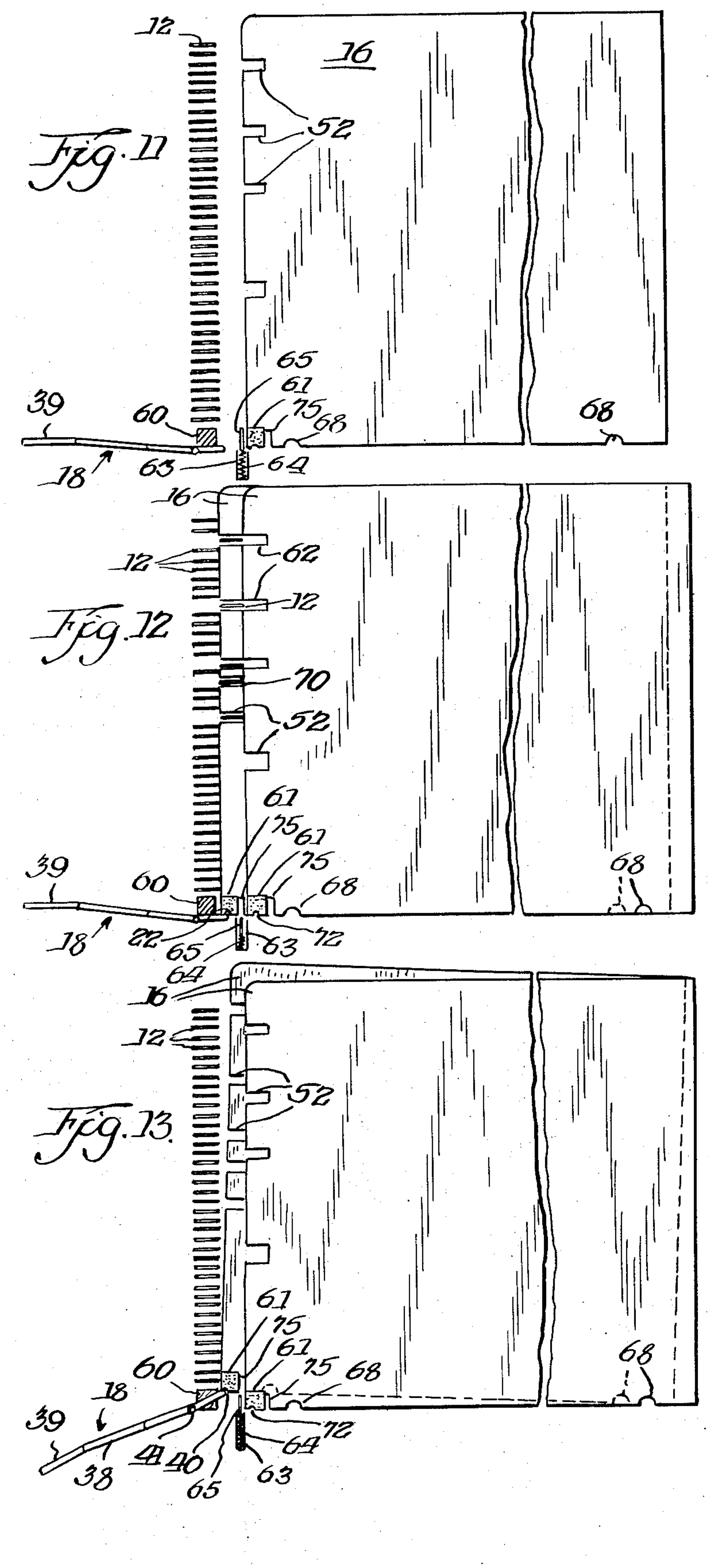
FIG. 11 is a transverse view of a series of selector knives, an elevator assembly and coded cards in a dormant, unselected state.
FIG. 12 is a similar view of the same apparatus illustrated in FIG. 11 showing the positions of the knives and coded cards after a select number of knives have been depressed.
FIG. 13 is another sequential view of the apparatus of FIG. 11, after the knives have been returned to their dormant positions and the selected card or cards have been isolated by means of the elevator bar assembly.

Once selector knives 12 have been drawn into or out of a specific engaging relationship with cards 16, card elevator bar 18 is employed to isolate selected cards from nonselected cards. Card elevator bar 18, as shown in FIG. 6, generally includes an outer depression bar 39 located outside housing 11, internal frame structure 40. As shown more specifically in FIG. 2, frame member 40 is pivoted on base 21 at pivot point 41. Thus, as depression bar 39 is depressed downwardly, frame structure 40 pivots about pivot point 41, and as shown in FIGS. 11–13, lifts selected cards so that they can be readily isolated and identified from nonselected cards.

It should be understood that the actual method of selecting randomly filed cards can be varied considerably in the practice of this invention. One method, as illustrated in FIGS. 2–3 and 11–13, involves the use of a permanent magnet card attractor element 60 supported on base 21 directly below selector knives 12, which acts in conjunction with selector knives 12 and a ferrous metal attachment or clip 61 attached to the lower corner of cards 16, to isolate and select randomly filed coded-cards. As illustrated in FIGS. 11–13, for example, card selection can be accomplished as follows.

Upon depression of specific selector knives 12, some selector knives will correspond identically with notches or die-cuts 52 formed on the leading edges of cards 16 as shown in FIGS. 11–14. For other cards 16 which do not have notches 52 corresponding with the individual depressed selector knives 12, the selector knives will move directly into an abutting or engaging relationship with the edge of the card as shown at 70 in FIG. 12.

In order to prevent a premature attraction of cards 16 to magnet 60, however, a retractable card holder bar 19 is provided. Retractable card holder bar 19, as shown in FIG. 7, includes a bar 65 upon which two return springs 64 are mounted at opposite ends thereof. A swivel bar 66 is connected at swivel point 69 to bar 65, and includes a pivot point 68 and a key 66 located outside housing 11. A vertical slot 63, as shown in FIG. 1, is provided in the wall of housing 11 to permit the upward and downward movement of the swivel bar 66 and resultant upward and downward movement of bar 65. In operation, swivel bar 66 is first moved into its uppermost position, thus raising bar 65, as shown in FIG. 11, and blocking the movement of cards 16. Then after selector knives 12 have been moved into their extended position, as shown in FIG. 12, swivel bar 66 is moved downwardly into a retracted position, bar 65 is brought out of engagement with card 16, and the magnetic attraction takes place between magnet 60 and ferrous element 61 on cards 16.

As shown in FIG. 12, however, only those cards 16 which have notches 52 corresponding identically to the displaced knives 12 are magnetically attracted and move toward magnet 60, the remaining cards being blocked by means of selector knives 12 as indicated generally at 70 in FIG. 12.

After the selected cards 16 have been drawn into an attracted position opposite magnet 60, swivel bar 66 on retractable card assembly 19 is released and moved upwardly allowing bar 65 to move upwardly to hold unselected cards in place so that they will not approach magnet 60 as the selector knives 12 are returned to their dormant position. In addition, as bar 65 is moved upwardly, it is brought into slot 75 formed on cards 16, to prevent any undesired displacement of cards that have been selected.

After selector knives 12 have been returned to their dormant position, the final steps of card retrieval require that the selected cards be raised into view, as shown in FIG. 13, so that they can be identified and isolated. This is accomplished, of course, by card elevator bar 18. Depression bar 39 is pressed downwardly and frame structure 40, which is pivoted about pivot point 41, is moved upwardly. A notch 72, formed along the lower edge of cards 16, accommodate frame structure 40. Thus, as frame structure 40 is raised, it mates with notch 72 and raises the selected cards in view, as shown in FIG. 13.

It should be understood, of course, that the retrieval of selected cards 16 can also be accomplished, for example, by first positioning all the cards against magnet 60 and then displacing selector knives 12 into their coded positions so that those cards 16 having notches 52 corresponding to the knives remain in position against magnet 60, while those cards not having notches corresponding to the knives are displaced laterally by the knives. The selected cards directly adjacent magnet 60 are then in position to be raised by elevator bar assembly 18, while the unselected cards are held in place, first by the selector knives 12, and then later by the retractable holder bar assembly 19. Other variations of these retrieval techniques, either with or without magnet 60, will occur to those skilled in the art and are contemplated as being within the scope of this invention.

Figure 14:
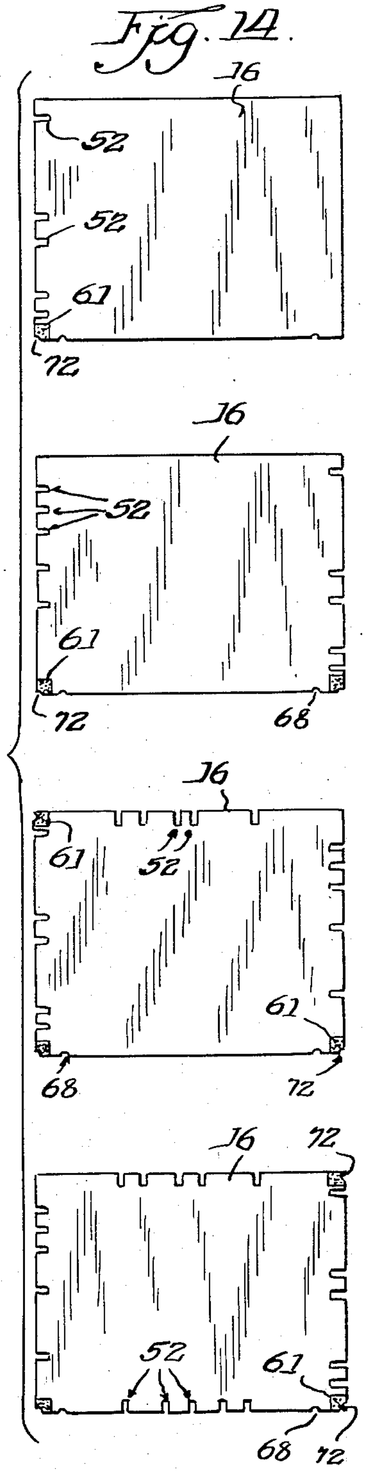
FIG. 14 is a view of a series of cards useful in the practice of this invention, showing a variety of card-coding and notch arrangements for the cards.

It should also be noted, as shown in FIG. 14, that coded notches 52 can be placed at various positions on cards 16, so that one or more series of selector knives, either above, below or on the opposite edges of the cards 16 can be used to effect the selection and retrieval of the cards.

Although the selected embodiments of this invention discussed herein are illustrative of the various features of this invention, it should be understood that these embodiments can be changed, modified or altered without departing from the spirit and scope of this invention as set forth in the following claims.

I claim:

1. A random access card filing and retrieval apparatus for selecting and retrieving data bearing cards having an edge-notching code impressed along one or more edges thereof comprising:

a. housing means for receiving and containing a plurality of said randomly filed cards;
b. means removably disposed within said housing means for supporting said cards within said housing means;
c. a plurality of parallel-spaced, slidable selector knives supportably disposed within said housing means in a position generally adjacent the leading edge of said cards bearing said edge-notching code, said selector knives being adapted to register with the notches formed along the edge of said cards bearing said edge-notching code;
d. means for independently and selectively displacing each of said selector knives in the direction of said cards for a predetermined distance sufficient to bring said selector knives into an abutting relationship with the edge of said cards bearing said edge-notching code;
e. means for displacing said cards in the direction of said selector knives, whereby those selected cards having notches registering with said displaced selector knives are capable of moving a predetermined distance in the direction of said selector knives, while those nonselected cards not having notches registering with said displaced selector knives are restrained by means of said displaced selector knives from movement in the direction of said selector knives;
f. means for locking said displaced, selected cards in a fixed position; and
g. means for isolating and separating said selected cards from said nonselected cards.

2. The card filing and retrieval apparatus of claim 1 wherein said selector knives are supportably disposed within said housing by means of a pair of oppositely disposed guide means, said guide means being attached to opposite walls of said housing means and including a plurality of parallel-spaced openings which receive each of said selector knives and are adapted to permit lateral sliding movement of said selector knives.

3. The card filing and retrieval apparatus of claim 2 wherein said plurality of selector knives are individually connected to a purality of elongated, slidable connecting rods, each of said connecting rods having a key assembly attached thereto and being slidably disposed within a shaft means, whereby said selector knives are independently and selectively displaced in the direction of said cards upon the depression of each of said key assemblies.

4. The card filing and retrieval apparatus of claim 1 wherein said cards are magnetically responsive and wherein said means for displacing said cards in the direction of said selector knives is a magnet disposed parallel to said plurality of selector knives, along the leading edge of said cards bearing said edge-notching code.

5. The card filing and retrieval apparatus of claim 4 wherein said cards are restrained by a retractable card holder assembly from attraction to said magnet before said selector knives are displaced in the direction of said cards, said card holder assembly including a retractable bar mounted within said housing directly adjacent the leading edge of said cards bearing the edge-notching code, whereby said retractable bar is adapted to move into a displaced position along the leading edge of said cards to restrain the movement of said cards in the direction of said selector knives and into a retracted position to permit free movement of said cards in the direction of said selector knives.

6. The card filing and retrieval apparatus of claim 1 wherein said means for supporting said cards within said housing means is a frame structure having two parallel spaced side rails capable of being removably secured within said housing means, and a plurality of U-shaped, card receiving members spaced along said side rails for retaining said cards.

7. The card filing and retrieving apparatus of claim 1 wherein said means for isolating and separating selected cards from nonselected cards is an elevator bar assembly pivotally mounted on the base of said housing means below said plurality of cards, one end of said elevator bar assembly being disposed outside said housing means, and the opposite end thereof extending along the length of said selector knives and being disposed beneath only those selected cards which have been displaced in the direction of said selector knives, whereby upon depression of the end of said elevator bar assembly disposed outside said housing means, the opposite end thereof is raised, engages and lifts said selected cards, thereby separating said selected cards from said nonselected cards.

8. A random access card filing and retrieval apparatus for selecting and retrieving data bearing cards having an edge-notching code impressed along oen or more edges thereof, said edge-notching code including one or more notches formed along the edge of said cards, comprising:

a. housing means for receiving and containing a plurality of said randomly filed cards;

b. card-receiving means removably disposed within said housing means for supporting said cards within said housing means;

c. a plurality of parallel-spaced, slidable selector knives supportably disposed within said housing means in a position generally adjacent the leading edge of said cards bearing said edge-notching code, said selector knives being adapted to register with the notches formed along the edge of said cards bearing said edge-notching code;

d. magnetic attraction means for holding said cards in an abutting relationship with said selector knives;

e. means for independently and selectively displacing each of said selector knives in the direction of said cards for a predetermined distance sufficient to slide into the notches formed in said cards having notches registering with said displaced selector knives, without displacing said cards, and to displace said cards not having notches registering with said displaced knives said predetermined distance, thereby separating said cards having notches registering with said displaced selector knives from said cards not having notches registering with said displaced selector knives; and f. means for elevating said nondisplaced cards above said displaced cards.

9. The card filing and retrieval apparatus of claim 8 wherein said selector knives are supportably disposed within said housing by means of a pair of oppositely disposed guide means, said guide means being attached to opposite walls of said housing means and including a plurality of parallel-spaced openings which receive each of said selector knives and are adapted to permit lateral sliding movement of said selector knives.

10. The card filing and retrieval apparatus of claim 9 wherein said plurality of selector knives are individually connected at one end to a plurality of elongated, slidable connecting rods, each of said connecting rods having a key assembly attached thereto and being slidably disposed within a shaft means, whereby said selector knives are independently and selectively displaced in the direction of said cards upon the depression of each of said key assemblies.

11. The card filing and retrieval apparatus of claim 8 wherein said card receiving means for supporting said cards within said housing means is a frame structure having two parallel spaced side rails capable of being removably secured to the base of said housing means, and a plurality of U-shaped, card receiving members spaced along said side rails for retaining said cards.

12. The card filing and retrieval apparatus of claim 8 wherein said means for elevating said nondisplaced cards is an elongated frame pivotally mounted on the base of said housing means, one end of said frame being disposed outside said housing means, and the opposite end thereof extending along the length of said selector knives and being disposed beneath only said nondisplaced cards, whereby upon depression of the end of said frame disposed outside said housing means, the opposite end thereof is raised, engages and lifts said nondisplaced cards, thereby separating said displaced cards from said nondisplaced cards.

* * * * *